No. 800,944. PATENTED OCT. 3, 1905.
V. ROYLE.
WORK SUPPORTING TABLE.
APPLICATION FILED SEPT. 23, 1904.
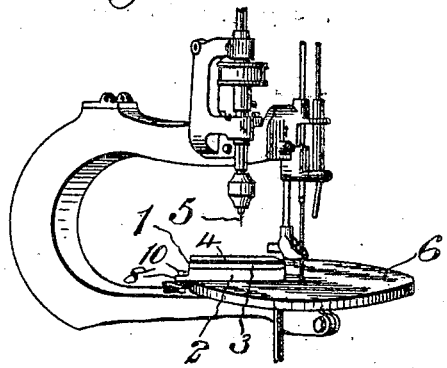
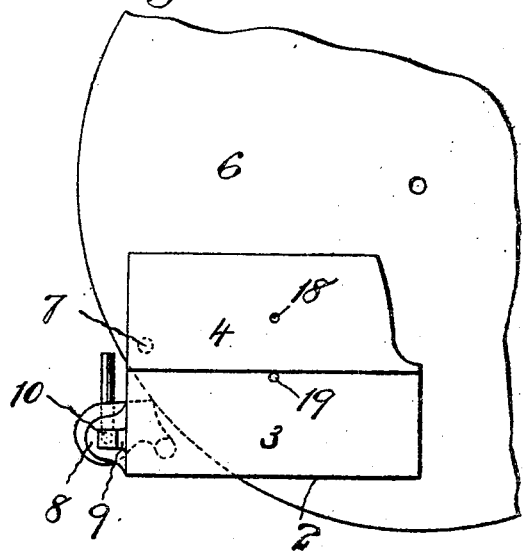
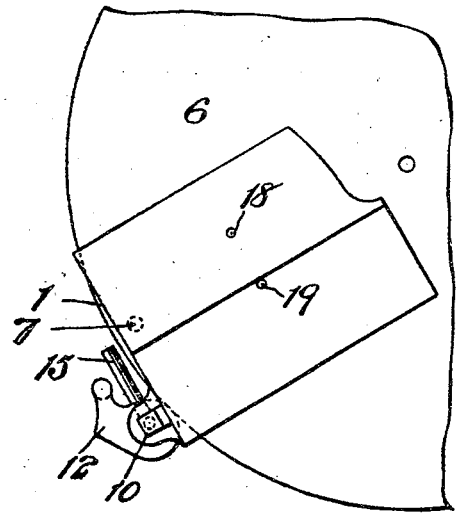
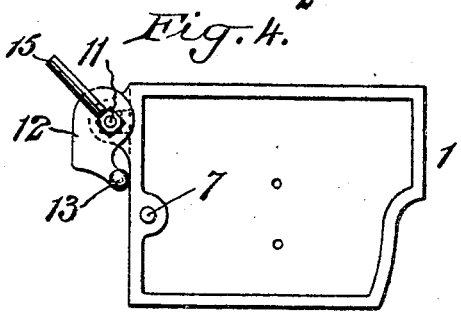
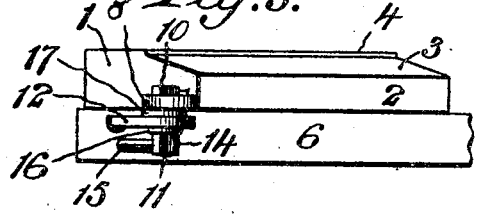
Witnesses:
F. George Barry,
F. G. Hachenberg.
Inventor-
Vernon Royle
by attorneys

UNITED STATES PATENT OFFICE.

VERNON ROYLE, OF PATERSON, NEW JERSEY.

WORK-SUPPORTING TABLE.

No. 800,944.  Specification of Letters Patent.  Patented Oct. 3, 1905.

Application filed September 23, 1904. Serial No. 225,618.

*To all whom it may concern:*

Be it known that I, VERNON ROYLE, a citizen of the United States, and a resident of Paterson, in the county of Passaic and State of New Jersey, have invented a new and useful Work-Supporting Table, of which the following is a specification.

My invention relates to a work-supporting table and means for adjusting it, and particularly to a table in the nature of an attachment to a drilling-machine for holding plates—such, for example, as electrotype-plates—in position to be drilled.

In the accompanying drawings, Figure 1 is a view in perspective, showing the location of the adjustable table on a main table, such as is commonly used in connection with a jig-saw and drill, and showing the position of the jig-saw and drill with respect to the table. Fig. 2 is an enlarged top plan view of the plate-supporting table in its relation to the main table and support. Fig. 3 is a similar view showing the table in another adjustment. Fig. 4 is a bottom plan view of the plate-supporting table in detail; and Fig. 5 is a view of the plate-supporting table in front elevation, showing it in position on the main table or support.

The plate-supporting table comprises a portion 1 with a flat top and a portion 2 with a slanting top 3, which is separated from the flat top of the portion 1 by means of an upright shoulder 4. It is intended that the slant or bevel 3 shall correspond to the angle at which the plate is beveled, so as to present the beveled portion of the plate through which it is desired to drill holes in substantially a horizontal plane under the drill 5.

The main supporting-table is denoted by 6. In the present instance it is circular in outline, and the plate-supporting table, composed of the parts 1 and 2, (shown as one integral piece,) is pivoted to the table 6 at 7 by a stud projecting from the bottom of the plate-table into a hole in the supporting-table 6.

The plate-supporting table, pivoted at 7, is provided on its outer end with an ear 8, in which there is formed an elongated slot 9 for the reception of the head 10 of a clamping-bolt 11. A cam 12 is mounted in swinging adjustment on the bolt 11 and is conveniently provided with a knob 13, by which it may be conveniently swung into the position desired. The periphery of the cam 12 bears against the periphery of the table 6, and the cam is held on the bolt 11 by means of a nut 14, provided with a tail or handle 15 for turning it on the bolt. A washer 16 may be interposed between the nut 14 and the under side of the cam 12, and the cam itself is preferably provided with an upwardly-projecting boss 17, bearing against the under side of the ear 8 on the end of the table.

By means of the nut 14 on the bolt 11 the cam 12 may be locked in position between the nut or its washer and the ear 8.

By loosening the nut 14 and swinging the cam 12 the plate-supporting table may be swung on its pivot 7 from the position shown in Fig. 2 to the position shown in Fig. 3, causing its perforations 18 and 19, which are intended to accommodate the point of the drill as it passes through the plate, to assume the exact position beneath the drill either for using the flat top of the table or the beveled part, as may be desired.

It will be observed that the cam 8 while serving to limit the swinging motion of the table away from the front or away from the operator as he stands before the table does not limit the swinging movement of the said plate-supporting table toward the operator; but this is not necessary, as the pressure on the plate-supporting table by the operator will be away from the operator, and hence will hold the cam 8 in engagement with the periphery of the primary table 6. Thus the table having been set to bring either one of the perforations 18 19 in alinement with the drill will be caused to assume the proper position with respect to the drill by simply pressing the plate against the shoulder 4 in case the bevel is to be drilled or pressing the table bodily with the plate thereon into position when the plate is to be supported on the flat top portion of the table.

The cam 12 affords a universal adjustment of the table within certain limits to the greatest degree of nicety and is a very convenient and simple device for accomplishing this adjustment.

It is evident that changes might be resorted to in the form and arrangement of the several parts without departing from the spirit and scope of my invention. Hence I do not wish to limit myself strictly to the structure herein shown and described; but

What I claim is—

1. The combination with a work-supporting table and a support to which it is pivoted, the said support having a curved periphery and the table being pivoted eccentrically with respect to the said curved periphery of the support, of a cam carried by the work-supporting table in position to bear against the curved periphery of the table-support and means for locking the cam in different rocking adjustments to arrest the swinging movement of the table in different adjustments.

2. The combination with a suitable support provided with a curved periphery and a work-supporting table pivoted eccentrically with respect to the curved periphery of said support, of a cam carried by the work-supporting table in position to engage the periphery of the table-support and mounted to swing in a plane parallel with the plane in which the table swings and means for locking the cam in different rocking adjustments to arrest the swinging movement of the table in different adjustments.

3. The combination with a work-supporting table provided with a top having portions set at an angle to each other and provided with perforations for the reception of the point of a drill, of a support to which the table is pivoted, a cam for adjusting the table to bring any one of the openings in alinement with the drill, means for mounting the cam on the table and means for locking the cam in the desired adjustment.

4. The combination with a work-supporting table and a primary table or support to which it is pivoted, the said work-supporting table being provided with an extended ear, of a bolt having its head seated in the ear, a cam mounted on the bolt beneath the ear and a tail-nut mounted on the bolt beneath the cam, the said cam having a bearing against the periphery of the table-support and the nut serving to lock the cam in the desired rocking adjustment.

In testimony that I claim the foregoing as my invention I have signed my name, in presence of two witnesses, this 19th day of September, 1904.

VERNON ROYLE.

Witnesses:
FREDK. HAYNES,
C. S. SUNDGREN.